United States Patent
Iida et al.

(10) Patent No.: US 7,325,235 B2
(45) Date of Patent: Jan. 29, 2008

(54) DATA PROCESSING APPARATUS, DATA PROCESSING METHOD, PROGRAM, AND STORAGE MEDIUM

(75) Inventors: Mitsunori Iida, Chiba (JP); Hisashi Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 10/274,924

(22) Filed: Oct. 22, 2002

(65) Prior Publication Data

US 2003/0079063 A1   Apr. 24, 2003

(30) Foreign Application Priority Data

Oct. 23, 2001   (JP)   .............................. 2001/325139
Oct. 2, 2002    (JP)   .............................. 2002/290151

(51) Int. Cl.
 G06F 3/00   (2006.01)
(52) U.S. Cl. ...................................................... 719/310
(58) Field of Classification Search ................ 710/104; 719/327, 321, 310
See application file for complete search history.

(56) References Cited

U.S. PATENT DOCUMENTS

| | | | |
|---|---|---|---|
| 6,094,548 A * | 7/2000 | Gunning et al. | 399/75 |
| 6,940,614 B2 * | 9/2005 | Subramaniam | 358/1.13 |
| 2002/0051194 A1 * | 5/2002 | Sakura | 358/1.15 |

FOREIGN PATENT DOCUMENTS

| | | |
|---|---|---|
| JP | 6-008534 | 1/1994 |
| JP | 9-006557 | 1/1997 |
| JP | 10-097414 | 4/1998 |
| JP | 11-28803 | 2/1999 |
| JP | 11-184656 | 7/1999 |
| JP | 11-265268 | 9/1999 |
| JP | 2000-10753 | 1/2000 |
| JP | 10181485 | * 1/2000 |
| JP | 2000-305755 | 11/2000 |
| JP | 2000-353079 | 12/2000 |
| JP | 2001-237745 | 8/2001 |
| WO | WO 01/46803 A2 * | 6/2001 |

OTHER PUBLICATIONS

Wang et al., Synthesizing operating system based device drivers in embedded systems, International Symposium on Systems Synthesis, pp. 37-44 Year of Publication: 2003, ACM Press.*
Akari et al., A non-stop updating technique for device driver programs on the IROS platform, Communications, 1995. ICC 95 Seattle, Gateway to Globalization, 1995 IEEE International Conference on, vol. 1, Jun. 18-22, 1995 pp. 88-92 vol. 1.*

* cited by examiner

Primary Examiner—William Thomson
Assistant Examiner—LeChi Truong
(74) Attorney, Agent, or Firm—Fitzpatrick, Cella, Harper & Scinto

(57) ABSTRACT

Disclosed herein is a data processing apparatus capable of controlling a peripheral device by using a driver program. The data processing apparatus comprises: an input device adapted to input a switch designation of the driver program; an acquisition device adapted to acquire data including specification information settable in a driver program of an original device before being switched and data including specification information settable in a driver program of a destination device to be switched to, based on the switch designation inputted by the input device; and a generation device adapted to generate setting information interpretable by an application program based on the specification information acquired by the acquisition device, method and program product for the data processing apparatus.

16 Claims, 14 Drawing Sheets

FIG. 3
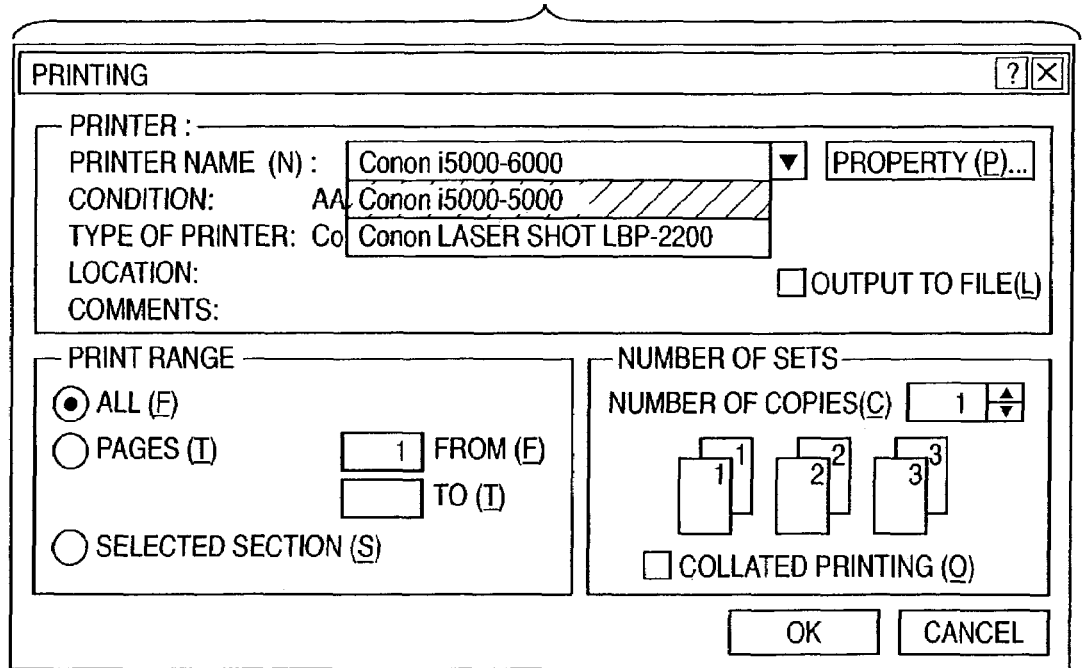
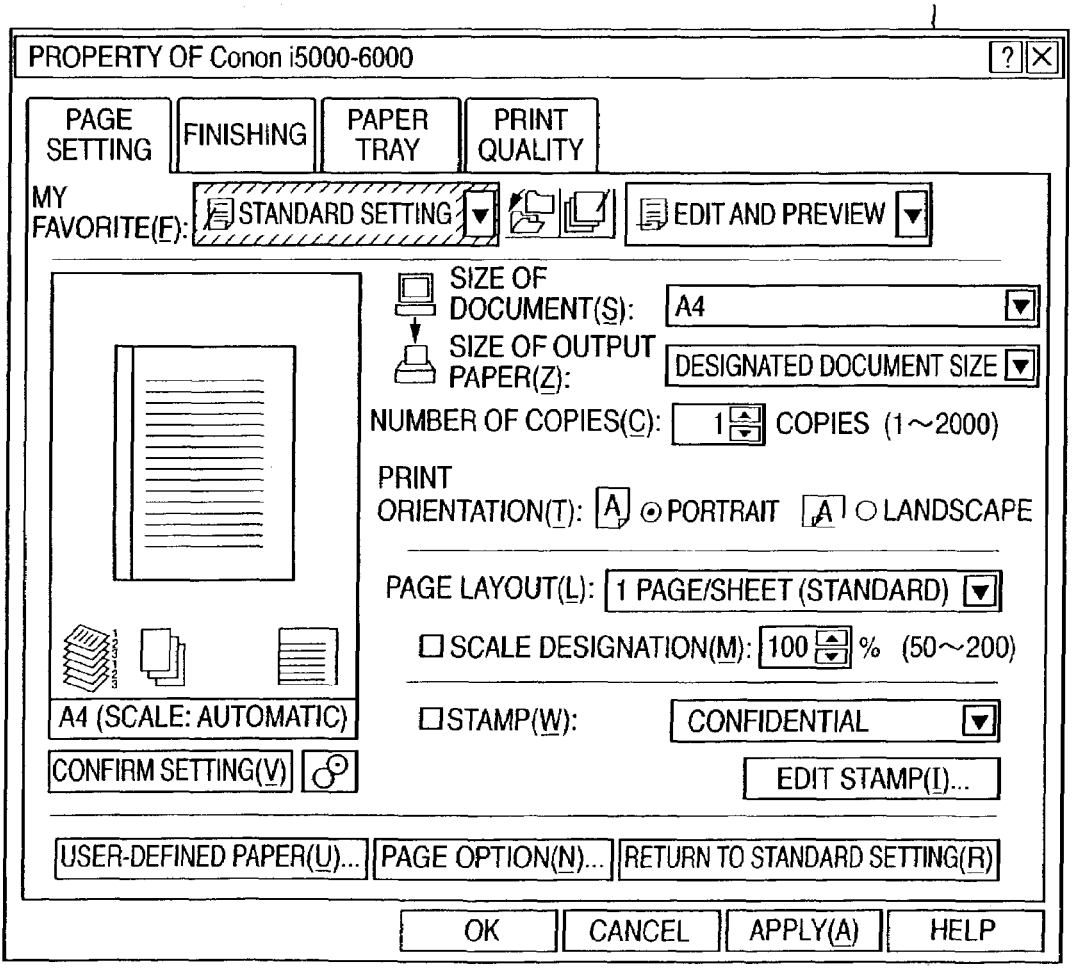

FIG. 7

```
        <?xml version="1.0"encoding="Shift-JIS"?>
        <!DOCTYPE DEVMODE [
        <!ELEMENT DEVMODE (PublicData,PrivateData)>
        <!ELEMENT PublicData (dmPrinterName, dmExtraSize, dmDitherType)>
        <!ELEMENT dmPrinterName (#PCDATA)>
DTD     <!ELEMENT dmExtraSize (#PCDATA)>
        <!ELEMENT DrvFamName (#PCDATA)>
        <!ELEMENT DeviceName (#PCDATA)>
        <!ELEMENT Nup EMPTY>
        <!ATTLIST Nup AttNup (1|2|4|8)"1">
        <!ELEMENT Stamp EMPTY>
        <!ATTLIST Stamp AttStamp (Disable|secret|copy))"Disable">
        ]>
                <DEVMODE>
                    <PublicData>
Public Area             <dmPrinterName>LBP-XXXX</dmPrinterName>
                        <dmExtraSize>25</dmExtraSize>
                    </PublicData>
                    <PrivateData>
                        <DeviceName>Conon LASER SHOT LBP-XXXX</DeviceName>
Private Area            <Nup AttNup="2"/>
                        <Stamp AttStamp="secret"/>
                    </PrivateData>
                <DEVMODE>
```

DATA PROCESSING APPARATUS, DATA PROCESSING METHOD, PROGRAM, AND STORAGE MEDIUM

FIELD THE INVENTION

The present invention relates to a data processing apparatus, data processing method, program, and storage medium.

BACKGROUND OF THE INVENTION

Data processing apparatuses using a driver program for controlling peripheral devices, e.g., printers, digital cameras, scanners or the like, have conventionally been known. Such data processing apparatuses are capable of setting up various configuration settings related to the peripheral devices by using the driver program.

However, in the conventional data processing apparatuses, when a driver program is switched, unconditionally a partial setting only is inherited. Therefore, for those settings that are not inherited, a user must set up again.

In general, a printer driver which is familiar with the data structure of DevMode can interpret the DevMode. However, an application program cannot refer to contents of a printer-native setting.

For instance, in a case where a data processing apparatus, e.g., a computer, switches a printer for outputting an image, the print setting of the printer driver in the so-called public area only is inherited, and other settings that cannot be interpreted by the application program are reset to a default setting. In other words, conventionally in a case where a user performs print setting for a certain printer and thereafter changes an output destination to a different printer, the print setting, e.g., a layout, is not inherited except a specified setting, so that the user must perform setting again, causing poor usability.

Furthermore, because print settings often include data or commands that depend upon a printer, it has been unable to come up with a usage pattern of a print setting that is applicable to a plurality of printers.

SUMMARY OF THE INVENTION

The present invention has been proposed to solve at least one of the above-described problems of the conventional art, and has as its one of the features to provide a user-friendly data processing apparatus, data processing method, program, and storage medium.

According to an aspect of the present invention, the present invention provides a data processing apparatus, capable of controlling a peripheral device by using a driver program, a method applicable to this apparatus, and a program product. The data processing apparatus comprises: an input device inputting a switch designation of the driver program; an acquisition device acquiring data which includes specification information settable in a driver program of an original device before being switched and data which includes specification information settable in a driver program of a destination device to be switched to, based on the switch designation inputted by the input device; and a generation device generating setting information interpretable by an application program based on the specification information acquired by the acquisition device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows an example of user interfaces provided respectively for performing printer selection and printer setting in the computer provided as an embodiment of the present invention;

FIG. 7 is an example of an XML file obtained by converting the DevMode to XML data in the computer provided as an embodiment of the present invention;

DETAILED DESCRIPTION OF THE PREFERRED EMBODIMENTS

Preferred embodiments of the present invention will now be described in detail in accordance with the accompanying drawings. Note that the scope of the present invention is not limited to relative arrangements of the components and display screens provided in this embodiment, unless there is a specific description.

Figure 1:
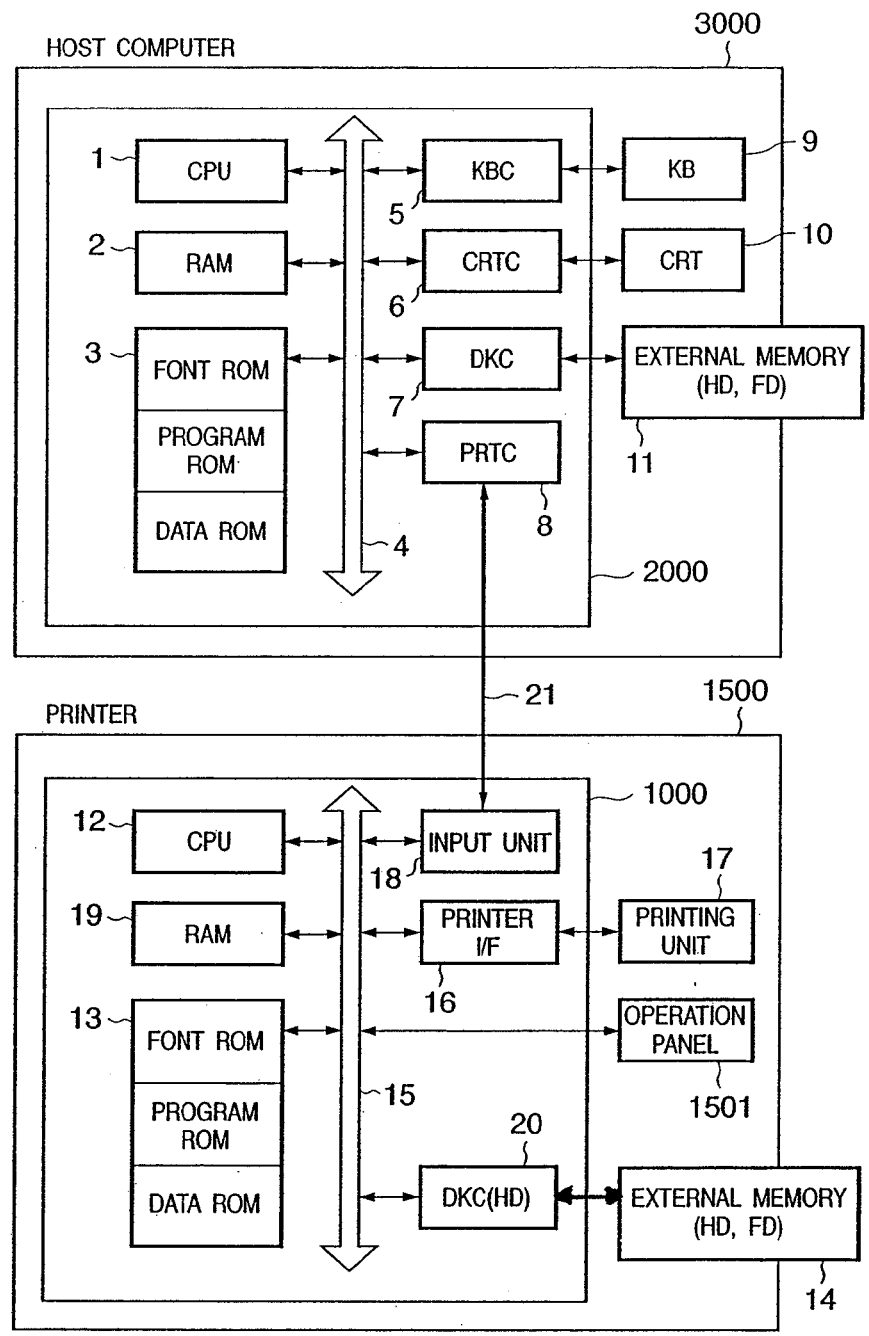
FIG. 1 is a block diagram showing a system construction which includes a computer provided as an embodiment of the present invention.

Hereinafter, a computer provided as an embodiment of a data processing apparatus according to the present invention is described. FIG. 1 is a block diagram showing a construction of a printer control system including the computer provided as the embodiment of the present invention. Note that unless specified otherwise, the present invention is applicable to a single device, a system comprising plural devices, or a system performing processing through a network, such as a LAN or WAN or the like, as long as functions according to the present invention are realized.

Referring to FIG. 1, reference numeral 3000 denotes a host computer which includes a CPU 1 for executing processing of a document including graphics, images, characters, and tables (including spreadsheets or the like), based on a document processing program stored in a program ROM of the ROM 3 or an external memory 11. The CPU 1 integrally controls each of the devices connected to a system bus 4.

The program ROM of the ROM 3 or the external memory 11 stores an operating system program (hereinafter referred to as an OS), serving as a control program of the CPU 1. The font ROM of the ROM 3 or the external memory 11 stores font data and so forth used for the aforementioned document processing. The data ROM of the ROM 3 or the external memory 11 stores various data used for the aforementioned document processing.

Reference numeral 2 denotes RAM serving as a main memory and work area of the CPU 1. Reference numeral 5 denotes a keyboard controller (KBC) which controls key inputs from a keyboard 9 and a pointing device (not shown). Reference numeral 6 denotes a CRT controller (CRTC) which controls displaying operation of a CRT display device (CRT) 10. Reference numeral 7 denotes a disk controller (DKC) which controls accessing the external memory 11, e.g., hard disk (HD), floppy disk (FD) or the like, that stores a boot program, various application programs, font data, user file, edited file, print control command generation program (hereinafter referred to as a printer driver) and so on.

Reference numeral 8 denotes a printer controller (PRTC) connected to a printer 1500 through a predetermined bi-directional interface unit 21 to execute communication control processing to communicate with the printer 1500. Note that the CPU 1 executes developing (rasterizing) of an outline font in, for instance, a display data RAM set in the RAM 2, realizing WYSIWYG on the CRT 10.

Furthermore, the CPU 1 opens various registered windows based on a command instructed by a mouse/cursor or the like (not shown) on the CRT 10 and executes various data processing. When printing is to be executed, a user can open a window related to print setting to set up a print configuration or set up a printing processing method including selection of a print mode, to be designated to a printer driver.

In the printer 1500, reference numeral 12 denotes a printer CPU, which outputs image signals as output data to a printing unit (printer engine) 17, connected to a system bus 15, based on a control program stored in a program ROM of ROM 13 or an external memory 14.

The program ROM of the ROM 13 stores a control program of the CPU 12. The font ROM of the ROM 13 stores font data and so forth used to generate the aforementioned output data. The data ROM of the ROM 13 stores data used by the host computer, in a case where a printer does not have the external memory 14, e.g., hard disk or the like.

The CPU 12 is capable of communicating with the host computer through an input unit 18, so that information in the printer can be informed to the host computer 3000. Reference numeral 19 denotes RAM serving as a main memory and work area of the CPU 12. The memory capacity of the RAM can be expanded by an optional RAM connected to an add-on port (not shown). Note that the RAM 19 is used as an output data rasterizing area, environmental data storage area, NVRAM or the like. The aforementioned hard disk (HD) and external memory 14, such as an IC card or the like, are access-controlled by a disk controller (DKC) 20.

The external memory 14, connected as an option, stores font data, an emulation program, form data, and so forth. The input unit 18 comprises a switch for operating the aforementioned operation panel and an LED indicator. The aforementioned external memory is not limited to one, but one or more external memories may be provided. Thus, plural external memories may be connected to store an optional font card in addition to the font data already stored, and a program for interpreting a printer control language of different language systems. Moreover, NVRAM may be provided to store printer mode setting data set on an operation panel 1501.

Figure 2:
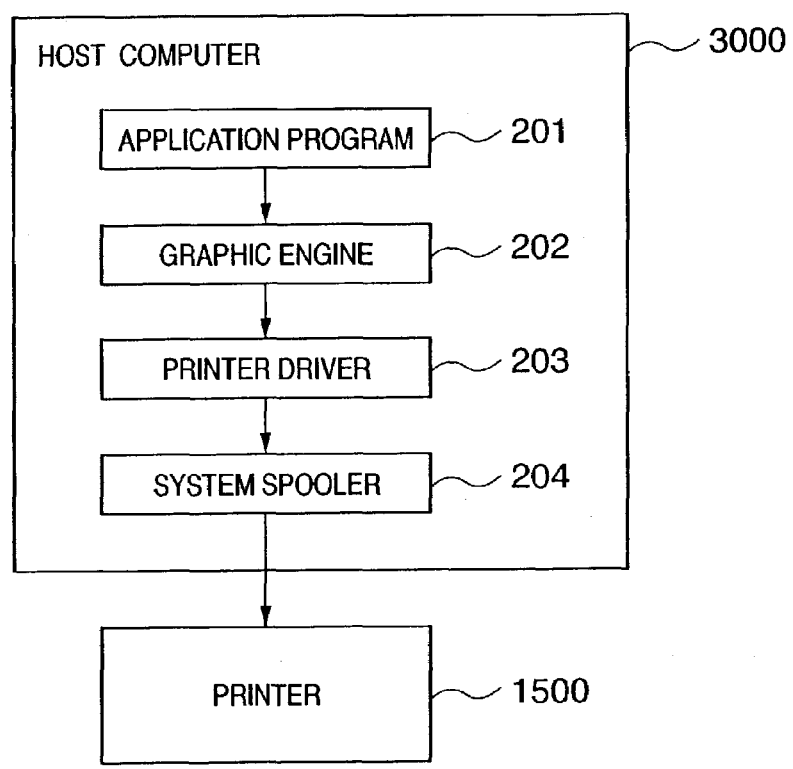
FIG. 2 is a block diagram describing a typical print data generation method in the computer provided as an embodiment of the present invention.

FIG. 2 is a block diagram describing a typical print data generation method in the host computer.

An application program 201, graphic engine 202, printer driver 203, and system spooler 204 are stored as files in the external memory 11. They are program modules, loaded to the RAM 2 by an OS or a module utilizing the OS, and executed. The application program 201 and printer driver 203 can be added to the HD of the external memory 11 through the FD of the external memory 11, CD-ROM (not shown), or a network (not shown).

The application program 201 stored in the external memory 11 is loaded to the RAM 2 and executed. When a printing command is sent from the application program 201 to the printer 1500, the graphic engine 202 that has been similarly loaded to the RAM 2 and being executable is used to perform output (rendering) operation. The graphic engine 202 loads the printer driver 203, provided for each printer, from the external memory 11 to the RAM 2, and converts data outputted from the application program 201 to a printer control command by using the printer driver 203. The printer control command is outputted to the printer 1500 through the system spooler 204, loaded to the RAM 2 by the OS, and through the interface unit 21.

FIG. 3 shows an example of a user interface for selecting an arbitrary printer from plural printers registered in the system, and a user interface for setting up a print configuration of the selected printer. In this example, a print dialogue box 301 is a user interface provided by an operating system. Printers registered in the operating system are listed in FIG. 3, and a user can select an arbitrary printer. By clicking a property button, a printer driver corresponding to the selected printer is called, and the printer driver opens a user interface 302 for performing print setting of the printer.

Figure 4:
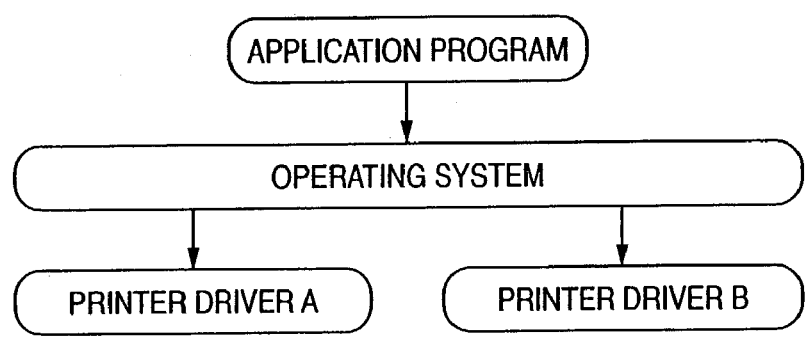
FIG. 4 shows a relation between an application program and printer drivers of respective printers in the computer provided as an embodiment of the present invention.

FIG. 4 is a diagrammatic view showing a relation between an application program and printer drivers of respective printers. The application program calls various functions (API) provided by the operating system to perform processing, while the operating system calls a. function (DDI) provided by the printer driver of the selected printer to perform processing related to printing. Accordingly, printing is performed by the printer selected by the application program.

Figure 5:
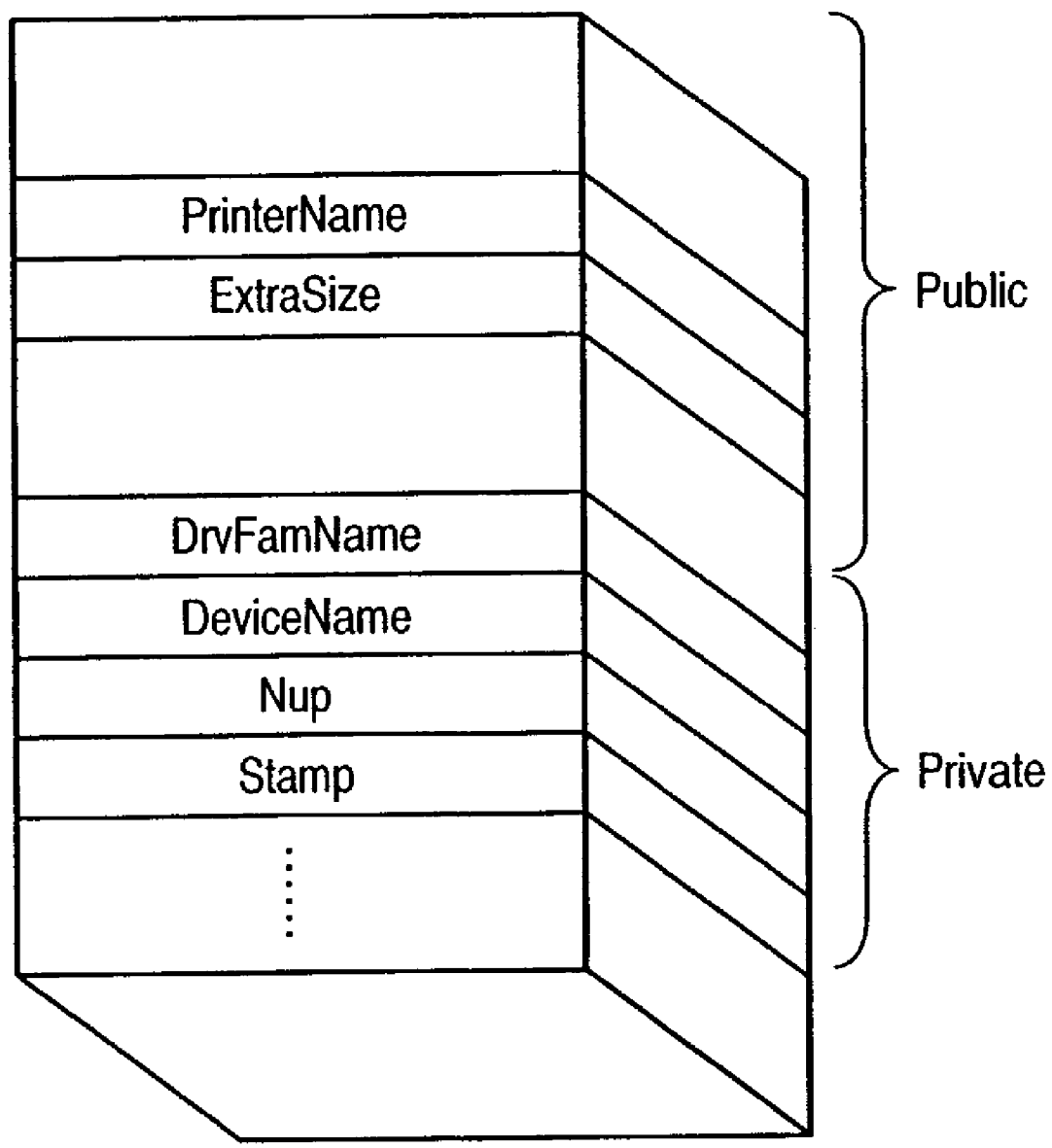
FIG. 5 is a diagrammatic view showing a construction of a DevMode storing a print setting in the computer provided as an embodiment of the present invention.

FIG. 5 is a diagrammatic view showing a construction of a memory block (hereinafter referred to as DevMode), storing a print setting of the printer exchanged among the printer driver, operating system and application program shown in FIG. 4.

The DevMode is constructed with a Public area, serving as a memory block defined by the operating system, and a Private area, serving as a memory block defined uniquely by each printer driver. Setting the Public area, which is defined by the operating system, can be performed by any of the application program, operating system, and printer driver. The private area, which is defined by each printer driver, stores a preferred example of printer-native setting information, and setting the Private area can be performed only by a printer driver. The size of the Private area is different for each printer driver. The Public area has a member called ExtraSize for storing the size of the Private area, so that determination of the entire size of the DevMode is possible. The operating system inquires the printer driver of the area size of the DevMode. Then, the application program or operating system secures the size of the area, and the printer driver performs initializing and setting of the area. When printing is to be executed, the printer driver performs printing in accordance with the setting of this area.

Note that there is a printer driver which supports plural types of printers by one program module. In this case, the definition of the Private area does not change even if the type of printer changes.

According to the present embodiment, the PrinterName storing a registration name of a printer registered in the system, and ExtraSize storing the size of the Private area are defined in the Public area. The DeviceName storing the type of printer, Nup storing a Nup print setting where printing is performed by allocating plural logical pages to one physical page, and stamp storing a stamp setting are defined in the Private area.

Figure 6:
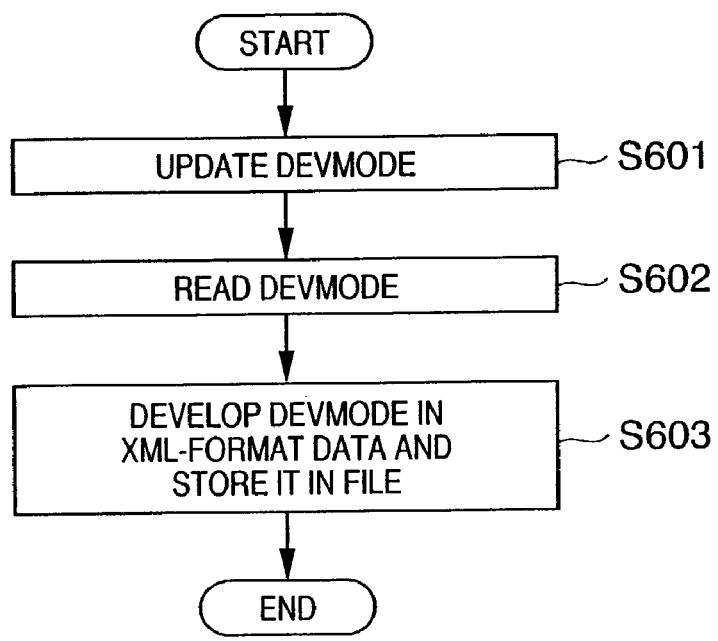
FIG. 6 is a flowchart describing conversion processing of the DevMode to XML data in the computer provided as an embodiment of the present invention.

FIG. 6 is a flowchart describing conversion processing of a content of the DevMode to XML-format data. This processing is performed when the setting of the DevMode is changed or a printer driver is added. First, when a setting content of the DevMode is changed in a printer property (S601), the printer driver reads the DevMode and develops it in the memory (S602). Then, the printer driver converts the DevMode developed in the memory to XML-format data, and stores it in a file (S603). According to this process, the setting content of the DevMode is stored as XML-format data.

FIG. 7 is an example of an XML file obtained by developing the DevMode according to the processing shown in FIG. 6. The upper portion of the program shown in FIG. 7 is a Document Type Definition (DTD) which is a preferred example of specification information that can be set in a driver program. The lower portion of the program in FIG. 7 shows XML data stored respectively in the Public area and Private area. As described above, the data structure of the setting information is described in the XML language having a text format, which is an example of a form interpretable by an application program or humans. Accordingly, the DevMode serving as print setting information can be utilized in various forms.

Figure 8:
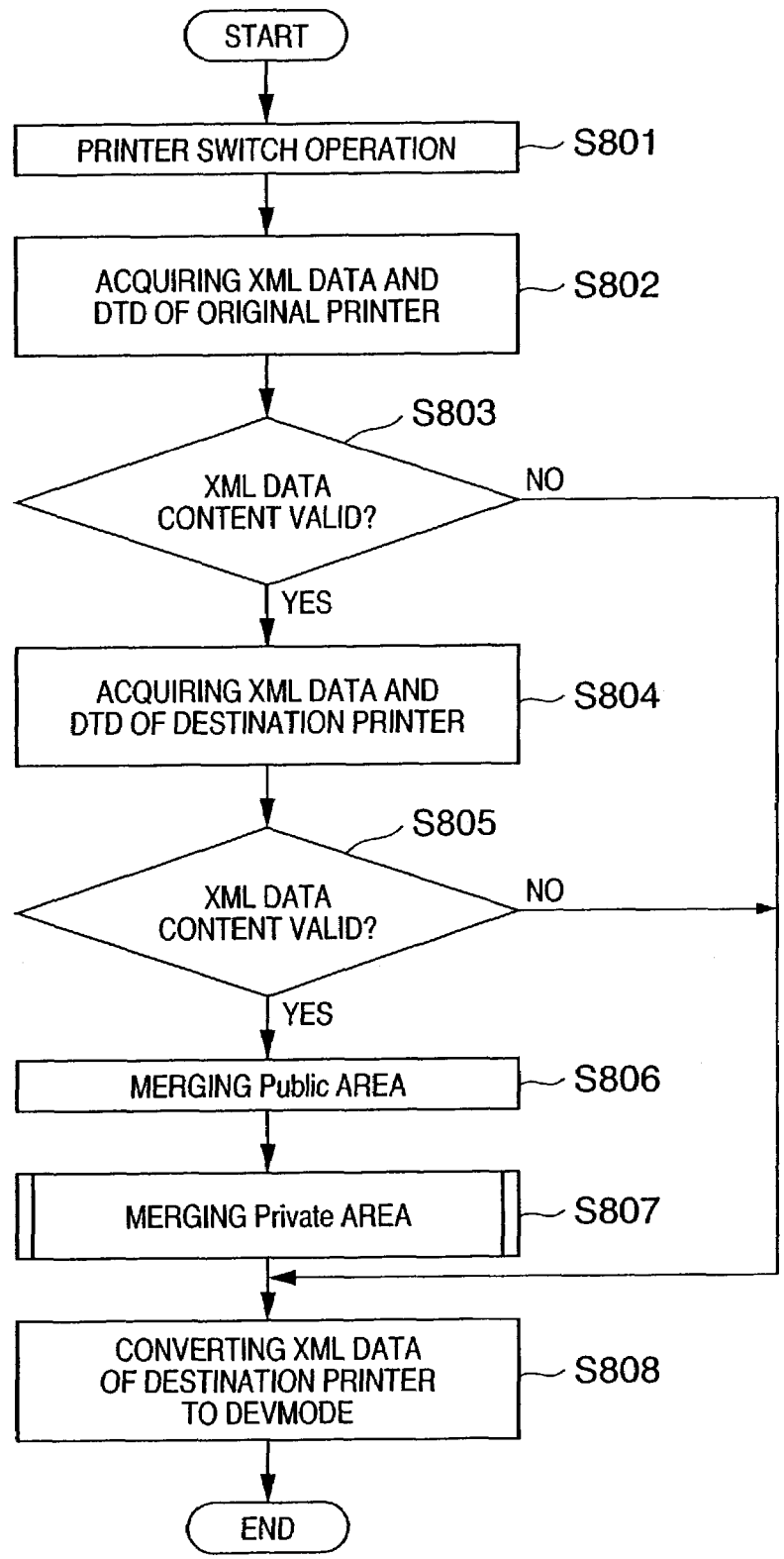
FIG. 8 is a flowchart showing merging processing of the DevMode in the computer provided as an embodiment of the present invention.

FIG. 8 is a flowchart showing processing of the operating system calling the printer driver, so that when a printer is switched, a print setting of an original printer before being switched (hereinafter referred to as the original printer) is merged and reflected to a destination printer to be switched to (hereinafter referred to as the destination printer).

The merging processing of the DevMode according to the present embodiment is described with reference to FIG. 8.

When a printer-switch operation is performed (S801), the printer driver of the destination printer acquires XML data of the original printer as well as the DTD which is a preferred example of specification information that can be set in the printer (S802). Next, based on the DTD acquired in step S802, it is determined whether or not the content of the XML data is valid (S803). If it is determined that the XML data is valid, the control proceeds to the next step; whereas if it is determined that the data is not valid, the control ends.

Next, the XML data and DTD of the destination printer are acquired (S804). Consistency of the XML data is determined as similar to step S803 (S805). If it is determined that the XML data is valid, the control proceeds to step S806; otherwise, the control ends.

By utilizing the XML data acquired in steps S802 and S804, the setting in the Public area included in the XML data of the original printer is merged to the XML data of the destination printer (S806).

Next, the setting of the Private area is merged (S807). This processing will be described in detail with reference to FIG. 9.

Figure 9:
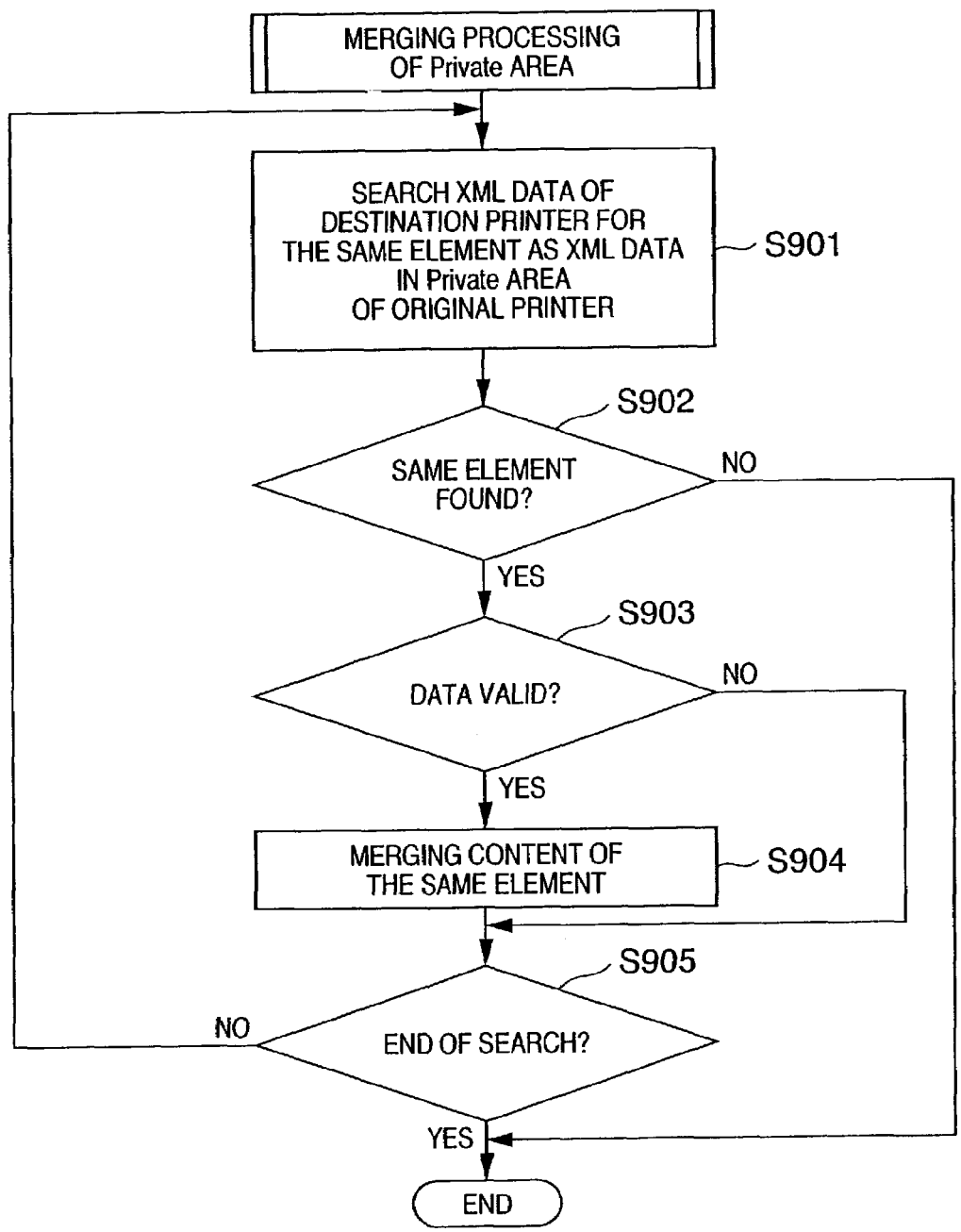
FIG. 9 is a flowchart showing merging processing of a Private area of the DevMode in the computer provided as an embodiment of the present invention.

FIG. 9 is a flowchart showing the merging processing of a Private area in step S807. First, the XML data of the original printer is compared with XML data of the destination printer to search the same element in the private area (S901). Then, it is determined whether or not the same element is found in the search in step S901 (S902). If the same element is found, whether or not the content of the searched element is valid is determined by referring to the DTD of the destination printer acquired in step S804 (S903). When it is determined that the data is valid, the setting content of the original printer is merged to the XML data of the destination printer (S904), and the control proceeds to the next step. Next, it is determined whether or not the search in step S901 is performed until the end of the file (S905). If YES, the control ends. If NO, the control returns to step S901 to search the same element. Meanwhile, if it is determined that the data is not valid in step S903, the control proceeds to the next step without merging processing, and then it is determined whether or not the search in step S901 is performed until the end of the file.

When the merging processing of the Private area shown in FIG. 9 is completed, the merged XML data of the destination printer is converted to the DevMode (S808), and the control ends. In this state, if there is a setting item provided by the XML data of the destination printer but not provided by the XML data of the original printer, a default value is set.

According to the foregoing processing, in a case where a printer is switched for print execution, even if the type of printer is different before and after the switch, all the setting information that can be merged is inherited by the destination printer.

Figure 10:
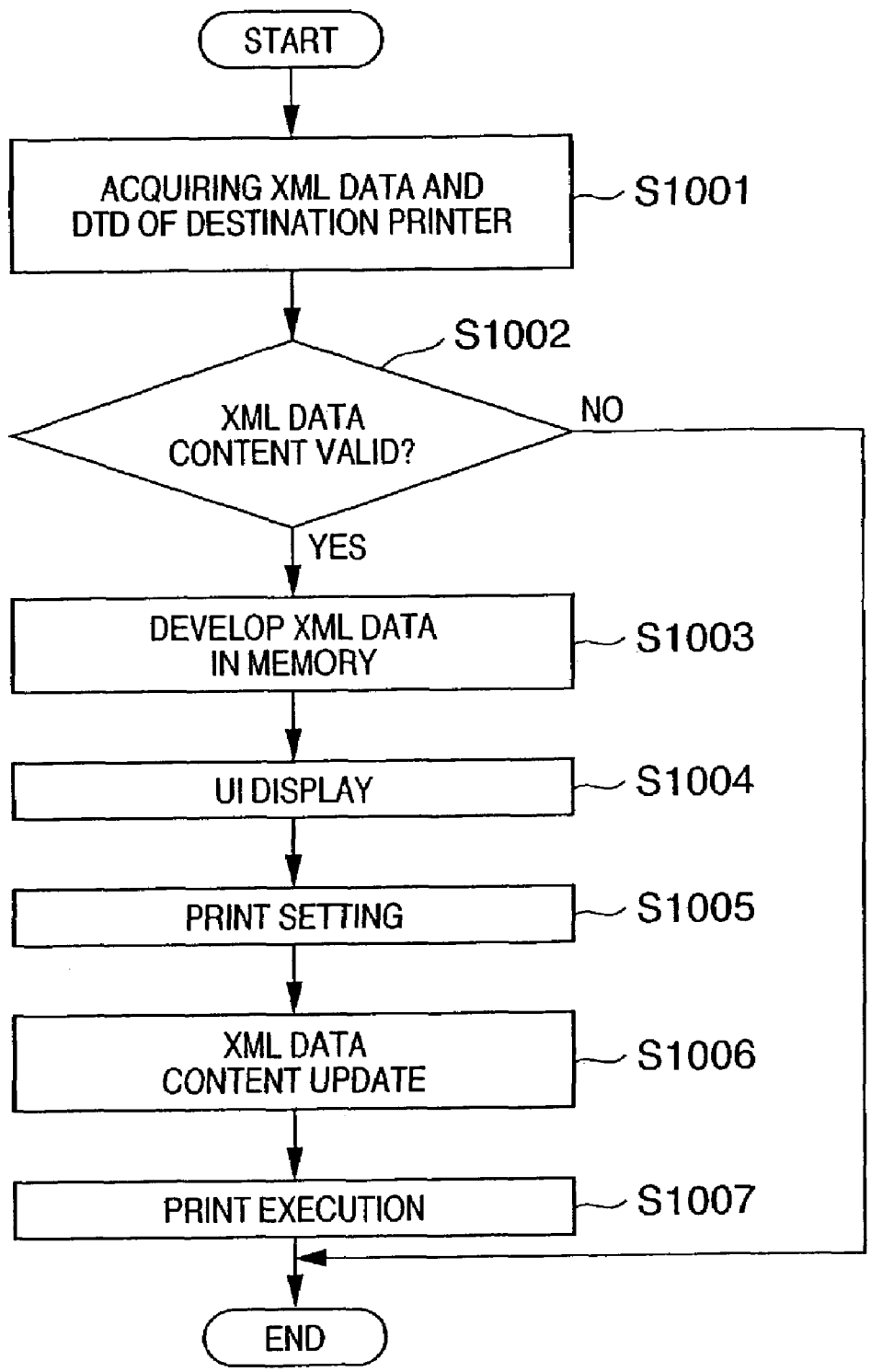
FIG. 10 is a flowchart showing print setting processing of an application program using the DevMode in the XML format, in the computer provided as an embodiment of the present invention.

FIG. 10 is a flowchart showing processing of an application program, which performs print setting based on the XML data converted from the DevMode by utilizing a unique user interface (UI), but not utilizing a UI function of the printer driver, and executes printing.

Figure 11:
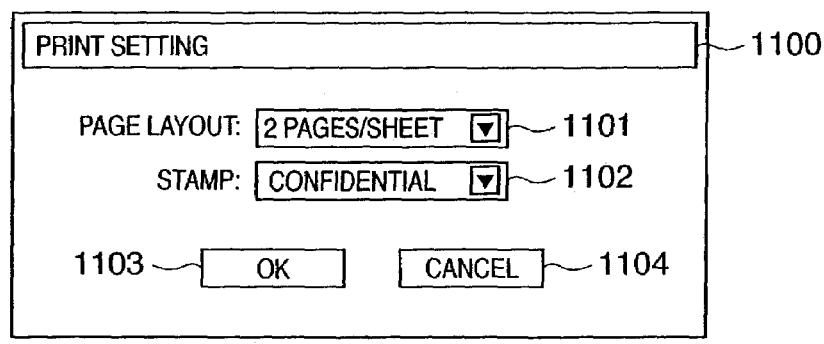
FIG. 11 shows an example of a user interface (UI) for print setting processing of an application program using the DevMode in the XML format, in the computer provided as an embodiment of the present invention.

The processing shown in FIG. 10 is described. The application program acquires XML data and DTD of the destination printer where the DevMode is converted as described in FIG. 6 (S1001). It is determined whether or not the content of the acquired XML data is valid by referring to the DTD (S1002). If it is determined that the data is valid, the control proceeds to the next step; whereas if it is determined that the data is not valid, the control ends. Next, the acquired XML data is developed in the memory, and the user interface unique to the application program, such as the example shown in FIG. 11, is displayed (S1004) by referring to the content of the DevMode, including the Private area, described in XML data. Print setting is performed by using the displayed user interface (S1005). Referring to FIG. 11, a combo box indicative of a page layout is displayed in the area 1101 of the window 1100, and a combo box indicative of a stamp is displayed in the area 1102. When the OK button 1103 in FIG. 11 is clicked, the content set in step S1005 is merged to the XML data of the destination printer (S1006), and printing is executed (S1007).

Figure 12:
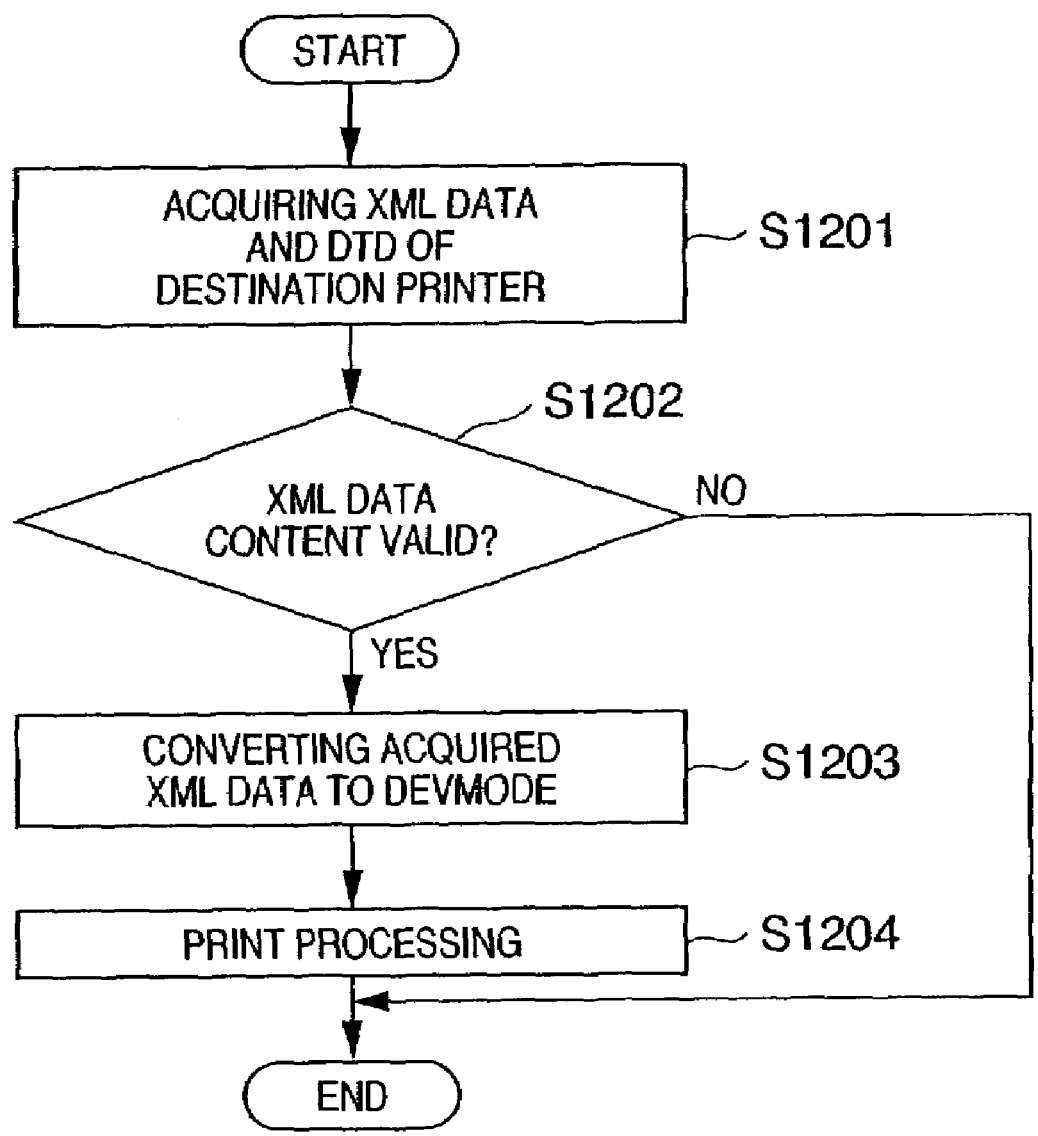
FIG. 12 is a flowchart showing a processing performed by a printer driver in the print setting processing of the application program using the DevMode in the XML format, in the computer provided as an embodiment of the present invention.

FIG. 12 is a flowchart showing processing of the printer-driver side after printing is executed in step S1007 in FIG. 10. Hereinafter, this processing is described. First, XML data and DTD of the destination printer are acquired (S1201), and consistency of the XML data is determined based on the DTD (S1202). If it is determined that the acquired XML data is valid in step S1202, the control proceeds to the next step; whereas if it is determined that the XML data is not valid, the control ends. Next, the acquired XML data is developed in the memory and converted to the DevMode (S1203). Then, print processing is executed by utilizing the converted DevMode (S1204).

As described above, by converting the DevMode in a versatile data format like XML data, an application program can refer to the content stored in the Private area of the DevMode. Accordingly, items displayed in the user interface can be freely customized without utilizing the UI function of the printer driver.

As a matter of course, the converted XML data may be transmitted from the computer 3000 to an external computer (not shown) to have the computer similarly execute the processing shown in FIG. 10 for displaying the screen shown in FIG. 11. Accordingly, the XML data can be used by various apparatuses.

Furthermore, with regard to conversion processing of print setting data, the following embodiment may be considered. There are printer drivers in which one program module supports plural types of printers. In this case, the definition of the Private area is the same even if the type of printer is different.

According to the present embodiment, the PrinterName storing a registration name of a printer registered in the system, and ExtraSize storing the size of the Private area are defined in the Public area. The DrvFamName storing a key for identifying a printer driver, DeviceName storing the type of printer, Nup storing a Nup print setting where printing is performed by allocating plural logical pages to one physical page, and stamp storing a stamp setting are defined in the Private area. For the same type of printer driver, that is, a driver constructed with the same program module, the same key is set in the DrvFamName even if the type of printer is different.

Figure 13:
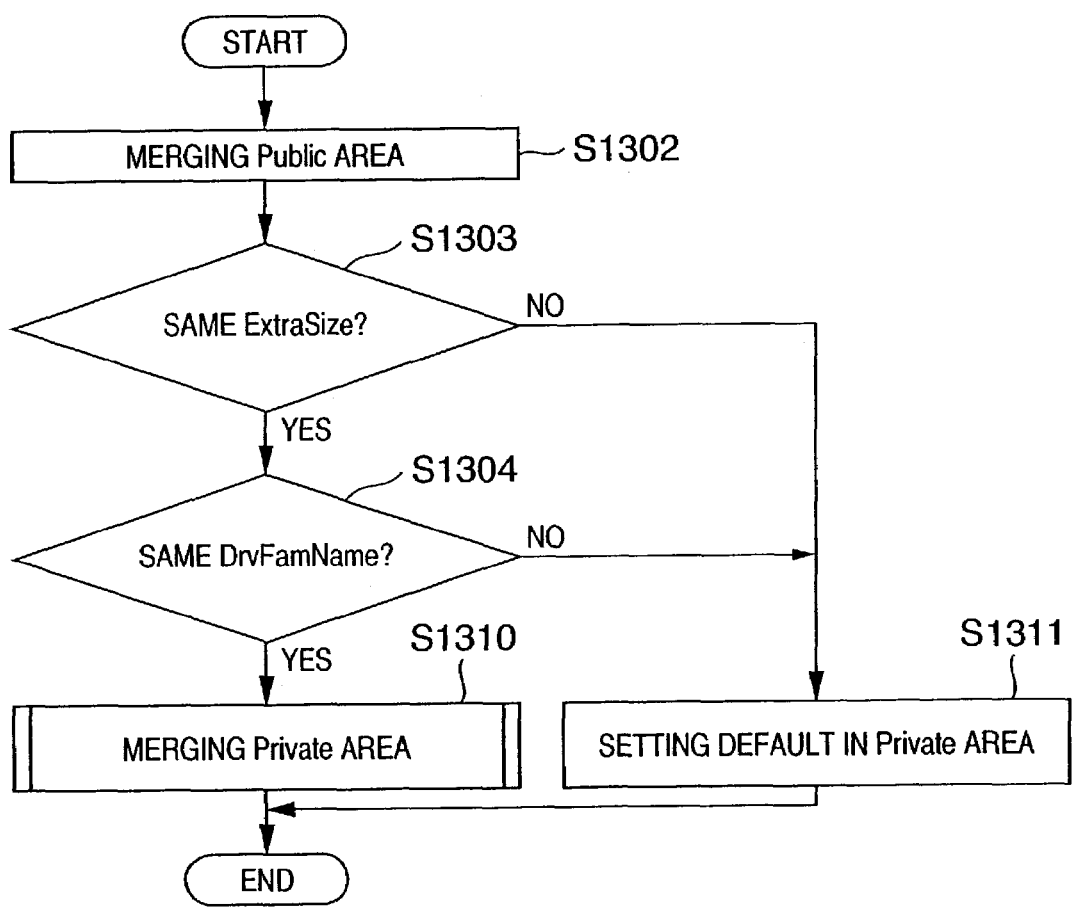
FIG. 13 is a flowchart showing processing of the DevMode in the computer provided as an embodiment of the present invention.

FIG. 13 is a flowchart showing processing performed when an operating system calls a printer driver, so that when a printer is switched, a print setting of an original printer is reflected (merged) to a print setting of a destination printer.

This processing is realized by the operating system transferring the DevMode area of the printer driver for the original printer and the DevMode area of the printer driver for the destination printer to the printer driver of the destination printer. The printer driver of the destination printer receives the memory area of the DevMode including a setting of the printer driver of the original printer and the memory area of the DevMode of the destination printer, and merges the setting of the printer driver of the original printer in the DevMode into the memory area of the DevMode of the destination printer.

First, with respect to the Public area, the setting of the DevMode is merged (S1302). Next, it is determined whether or not the ExtraSize of the Public area is the same (S1303). If the ExtraSize is the same, it is determined whether or not the DrvFamName is the same (S1304). If the ExtraSize or DrvFamName is not the same, it is determined to be a different program module from the printer driver of the original printer. In this case, since the setting of the Private area is unknown, a default setting is set in the Private area, and merging processing of the Private area is not performed (S1311). If the ExtraSize and DrvFamName are the same in steps S1303 and S1304, it is determined to be the same program module as the printer driver of the original printer. Then, merging processing of the Private area is performed (S1310), and the control ends.

Figure 14:
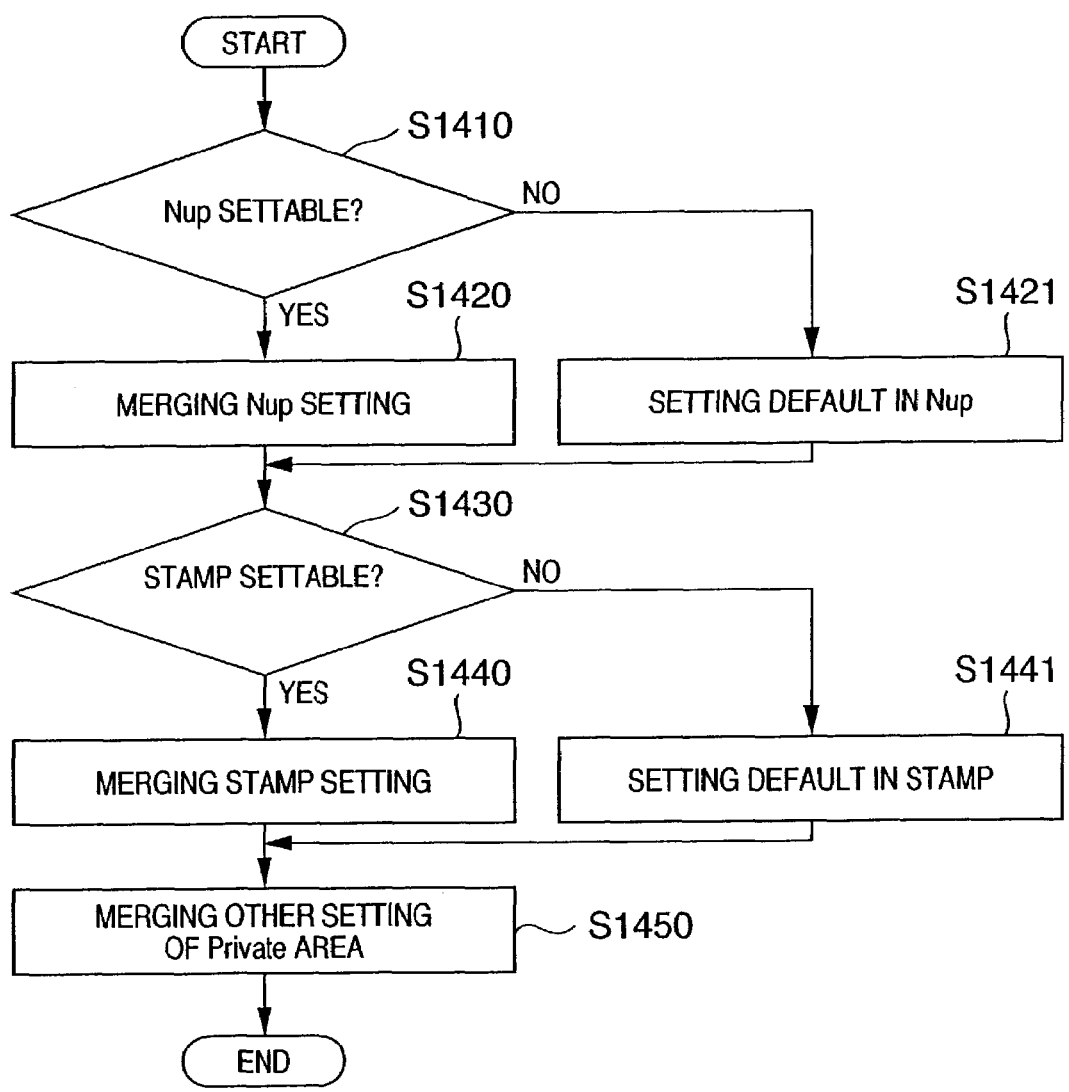
FIG. 14 is a flowchart showing merging processing of the DevMode in the computer provided as an embodiment of the present invention.

FIG. 14 is a flowchart showing another example of merging processing of the Private area performed in step S1310. Merging processing of the Private area is described with reference to FIG. 14. First it is determined whether or not a Nup setting of the original DevMode is settable (S1410). If YES, setting of the Nup is merged (S1420), but if NO, a default setting is set in the Nup (S1421). Next, it is determined whether or not a setting of the stamp in the original DevMode can be merged (S1430). If YES, the setting of the stamp is merged (S1440), but if NO, a default setting is set (S1441). In the similar manner, it is determined whether or not other settings of the original DevMode stored in the Private area are settable, and each setting is merged (S1450).

According to the processing shown in FIGS. 13 and 14, in a case where a printer is switched at the time of print execution, as long as the printer drivers of the printers before and after the switch are the same module, all the mergeable settings are inherited even if the type of printer is not the same before and after the switch.

Although the above description has been provided specifically on the printer driver, the present invention is not limited to this, but is applicable to a data processing apparatus having all types of drivers used for controlling peripheral devices.

Note that the data processing apparatus according to the present invention is not limited to a computer, but includes all types of apparatuses, e.g., digital cameras, printers and so on, that can control drivers. Furthermore, the data processing method according to the present invention is applicable to a system constituted by a plurality of devices (e.g., host computer, interface unit, reader, and printer).

Further, the present invention can be realized by providing a storage medium, storing program codes of software realizing the above-described functions of the embodiment, to a system or a computer (CPU or MPU) of an apparatus, reading the program codes stored in the storage medium by the system or computer of the apparatus, and executing the program.

In this case, the program codes read from the storage medium realize the functions according to the above-described embodiment, and the storage medium storing the program codes constitutes the invention.

The storage medium, such as a floppy disk, hard disk, optical disk, magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or the entire processes in accordance with designations of the program codes and realizes the functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or the entire process in accordance with designations of the program codes and realizes the functions of the above embodiment.

In a case where the present invention is applied to the aforesaid storage medium, the storage medium stores program codes corresponding to the above-described flowcharts.

As many apparently widely different embodiments of the present invention can be made without departing from the spirit and scope thereof, it is to be understood that the invention is not limited to the specific embodiments thereof except as defined in the claims.

What is claimed is:

1. A data processing apparatus for controlling a plurality of peripheral devices using a plurality of driver programs, the data processing apparatus comprising:
    a memory area configured to store setting data of a peripheral device of the plurality of peripheral devices, the memory including a public area and a private area inaccessible by an application and storing unique setting data of a driver program of the plurality of driver programs;
    an input unit configured to input a switch designation for switching a first driver program of the plurality of driver programs to a second driver program of the plurality of driver programs;
    an acquisition unit configured to acquire first setting data used by the first driver program from the public area in the memory area and second setting data from the private area in the memory area when the switch designation is inputted by said input unit;
    a determination unit configured to determine whether or not the first driver program and the second driver program are driver programs of the same type;
    a first selection unit configured to select third setting data available for the second driver program from the second setting data acquired from the private area, when said determination unit determines the first driver program and the second driver program are of the same type;
    a second selection unit configured to deselect the third setting data, when said determination unit determines the first driver program and the second driver program are not of the same type; and
    a generation unit configured to generate setting information interpreted by the application program, combining the first setting data acquired from the public area and any third setting data selected by the first selection unit.

2. The data processing apparatus according to claim 1, further comprising a transfer control unit configured to control transfer processing of the setting information interpreted by the application program, which is generated by said generation unit, to an external data processing apparatus.

3. The data processing apparatus according to claim 1, wherein said input unit inputs the switch designation in accordance with switching of the peripheral device.

4. The data processing apparatus according to claim 1, wherein the plurality of peripheral devices are printers, the plurality of driver programs are printer driver programs, and the setting information is print setting information.

5. The data processing apparatus according to claim 1, wherein the first setting data includes specification information native to a peripheral device corresponding to the first driver program.

6. The data processing apparatus according to claim 1, wherein a data format of the first setting data in the first driver program or the second driver program are described in a markup language.

7. A method employed in a data processing apparatus for controlling a plurality of peripheral devices using a plurality of driver programs, the method comprising:
    an input step of inputting a switch designation for switching a first driver program of the plurality of driver programs to a second driver program of the plurality of driver programs;
    an acquisition step of acquiring first setting data from a public area of a memory, the memory including a private area inaccessible by an application and storing unique setting data of a driver program of the plurality of driver programs and second setting data from the private area of the memory used by the first driver program in response to the switch designation inputted in said input step;
    a determining step of determining whether or not the first driver program and the second driver program are programs of the same type;
    a first selection step of selecting third setting data available for the second driver program from the second setting data acquired from the private area, when said determining step determines that the first driver program and the second driver program are of the same type;
    a second selection step of deselecting the third setting data, when said determination step determines the first driver program and the second driver program are not of the same type; and
    a generation step of generating setting information interpreted by the application program, combining the first setting data acquired from the public area and any third setting data selected by the first selection unit.

8. The method according to claim 7, further comprising a transfer control step of controlling transfer processing of the setting information interpreted by the application program, which is generated in said generation step, to an external data processing apparatus.

9. The method according to claim 7, wherein in said input step, the switch designation of a peripheral device is inputted in accordance with switching of the peripheral device.

10. The method according to claim 7, wherein the plurality of peripheral devices are printers, the plurality of driver programs are printer driver programs, and the setting information is print setting information.

11. The method according to claim 7, wherein the first setting data includes specification information native to a peripheral device corresponding to the first driver program.

12. The method according to claim 7, wherein a data format of the first setting data in the first driver program or the second driver program are described in a markup language.

13. A data processing apparatus for controlling a plurality of peripheral devices using a plurality of driver programs, the data processing apparatus comprising:
- a memory area configured to store setting data of a peripheral device of the plurality of peripheral devices, the memory including a public area and a private area inaccessible by an application and storing unique setting data of a driver program of the plurality of driver programs;
- input means for inputting a switch designation for switching a first driver of the plurality of driver programs to a second driver program of the plurality of driver programs;
- acquisition means for acquiring first setting data used by the first driver program from the public area in the memory area and second setting data from the private area in the memory area when the switch designation is inputted by said input means;
- determination means configured to determine whether or not the first driver program and the second driver program are programs of the same type;
- first selection means configured to select third setting data available for the second driver program from the second setting data acquired from the private area, when said determination means determines that the first driver program and the second driver program are of the same type;
- second selection means configured to deselect the third setting data, when said determination means determines that the first driver program and the second driver program are not of the same type; and
- generation means for generating setting information interpreted by the application program, combining the first setting data acquired from the public area and any third setting data selected by the first selection unit.

14. A control system for controlling a plurality of peripheral devices including a first data processing apparatus and a second data processing apparatus,
- wherein said first data processing apparatus comprises:
  - a memory area configured to store setting data of a peripheral device of the plurality of peripheral devices, the memory including a public area and a private area inaccessible by an application and storing unique setting data of a driver program of a plurality of driver programs;
  - an input unit configured to input a switch designation for switching a first driver program of the plurality of driver programs to a second driver program of the plurality of driver programs;
  - an acquisition unit configured to acquire first setting data used by the first driver program from the public area in the memory area and second setting data from the private area in the memory area when the switch designation is inputted by said input unit;
  - a determination unit configured to determine whether or not the first driver program and the second driver program are programs of the same type;
  - a first selection unit configured to select third setting data available for the second driver program from the second setting data acquired from the private area, when said determination unit determines the first driver program and the second driver program are of the same type;
  - a second selection unit configured to deselect the third setting data, when said determination unit determines the first driver program and the second driver program are not of the same type; and
  - a generation unit configured to generate setting information interpreted by the application program, combining the first setting data acquired from the public area and any third setting data selected by the selection unit; and
  - a control unit configured to control transfer processing of the setting information interpreted by the application program, which is generated by said generation unit, from said first data processing apparatus to said second data processing apparatus, and
- wherein said second data processing apparatus comprises:
  - a reception control unit configured to control reception processing of the setting information interpreted by the application program, which is transferred by transfer processing controlled by said transfer control unit;
  - an input control unit configured to control the application program for reading the received information; and
  - a display control unit configured to cause the application program to display the setting information on a display unit of the second data processing apparatus.

15. A computer-readable storage medium storing a program executable by a data processing apparatus for controlling a plurality of peripheral devices by using a plurality of driver programs, said program comprising:
- an input step of inputting a switch designation for switching a first driver program of the plurality of driver programs to a second driver program of the plurality of driver programs;
- an acquisition step of acquiring first setting data from a public area of a memory, the memory including a private area inaccessible by an application and storing unique setting data of a driver program of the plurality of driver programs and second setting data from the private area of the memory used by the first driver program in response to the switch designation inputted in said input step;
- a determining step of determining whether or not the first driver program and the second driver program are programs of the same type;
- a first selection step of selecting third setting data available for the second driver program from the second setting data acquired from the private area, when said determining step determines that the first driver program and the second driver program are of the same type;
- a second selection step of deselecting the third setting data when said determining step determines that the first driver program and the second driver program are not of the same type; and
- a generation step of generating setting information interpreted by the application program, combining the first setting data acquired from the public area and any third setting data selected by the selection unit.

16. A program product stored on a computer-readable medium and executable by a data processing apparatus for controlling a plurality of peripheral devices using a plurality of driver programs, said program product executing:
- an input step of inputting a switch designation for switching a first driver program of the plurality of driver programs to a second driver program of the plurality of driver programs;

an acquisition step of acquiring first setting data from a public area of a memory, the memory including a private area inaccessible by an application and storing unique setting data of a driver program of the plurality of driver programs and second setting data from the private area of the memory used by the first driver program in response to the switch designation inputted in said input step;

a determining step of determining whether or not the first driver program and the second driver program are programs of the same type;

a first selection step of selecting third setting data available for the second driver program from the second setting data acquired from the private area, when said determining step determines that the first driver program and the second driver program are of the same type;

a second selection step of deselecting the third setting data when said determining step determines that the first driver program and the second driver program are not of the same type; and a generation step of generating setting information interpreted by the application program, combining the first setting data acquired from the public area and any third setting data selected by the selection unit.

* * * * *

UNITED STATES PATENT AND TRADEMARK OFFICE
CERTIFICATE OF CORRECTION

PATENT NO. : 7,325,235 B2 Page 1 of 1
APPLICATION NO. : 10/274924
DATED : January 29, 2008
INVENTOR(S) : Iida et al.

It is certified that error appears in the above-identified patent and that said Letters Patent is hereby corrected as shown below:

<u>TITLE PAGE</u>:
    Item (56) FOREIGN PATENT DOCUMENTS, "JP   10181485   *   1/2000" should read -- JP  2000-003261  *  1/2000 --.

<u>COLUMN 1</u>:
    Line 46, "its one of the" should read -- one of its --.

<u>COLUMN 4</u>:
    Line 60, "a." should read -- a --.

<u>COLUMN 5</u>:
    Line 17, "the printer driver of" should read -- of the printer driver --.

<u>COLUMN 8</u>:
    Line 67, "are" should read -- being --.

<u>COLUMN 9</u>:
    Line 4, "processes" should read -- process --.

<u>COLUMN 11</u>:
    Line 67, Claim 14 "and" should be deleted.

<u>COLUMN 12</u>:
    Line 11, Claim 14 "and" should be deleted.

Signed and Sealed this

Twelfth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,325,235 B2 Page 1 of 1
APPLICATION NO. : 10/274924
DATED : January 29, 2008
INVENTOR(S) : Iida et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 727 days Delete the phrase "by 727 days" and insert -- by 696 days --

Signed and Sealed this

Twenty-eighth Day of July, 2009

JOHN DOLL
*Acting Director of the United States Patent and Trademark Office*